A. L. WASTEL.
MILK COOLER.
APPLICATION FILED OCT. 5, 1909.
961,275.
Patented June 14, 1910.
2 SHEETS—SHEET 1.
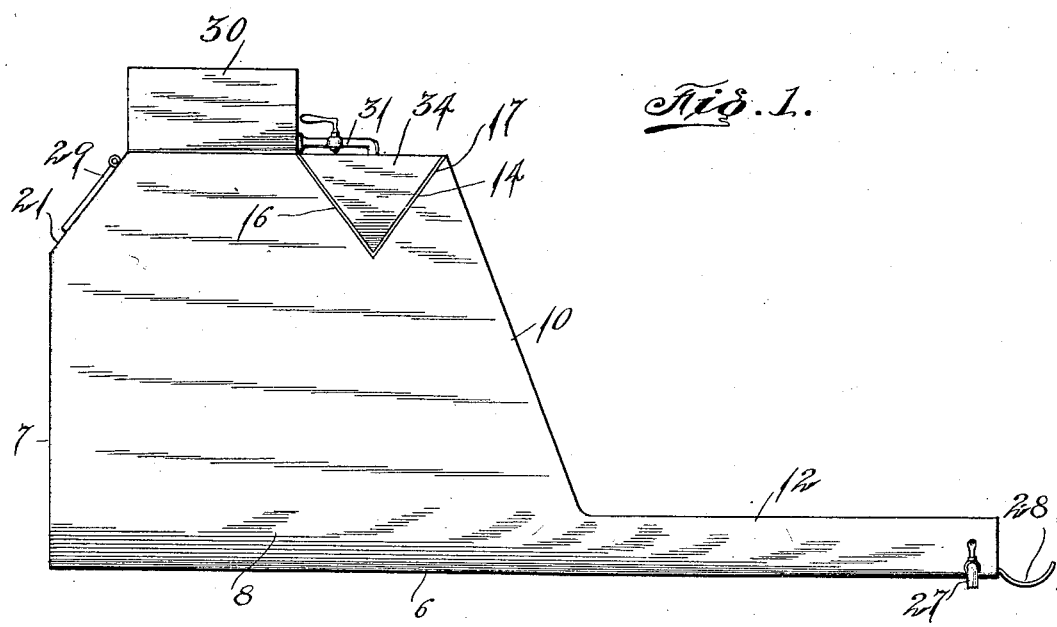
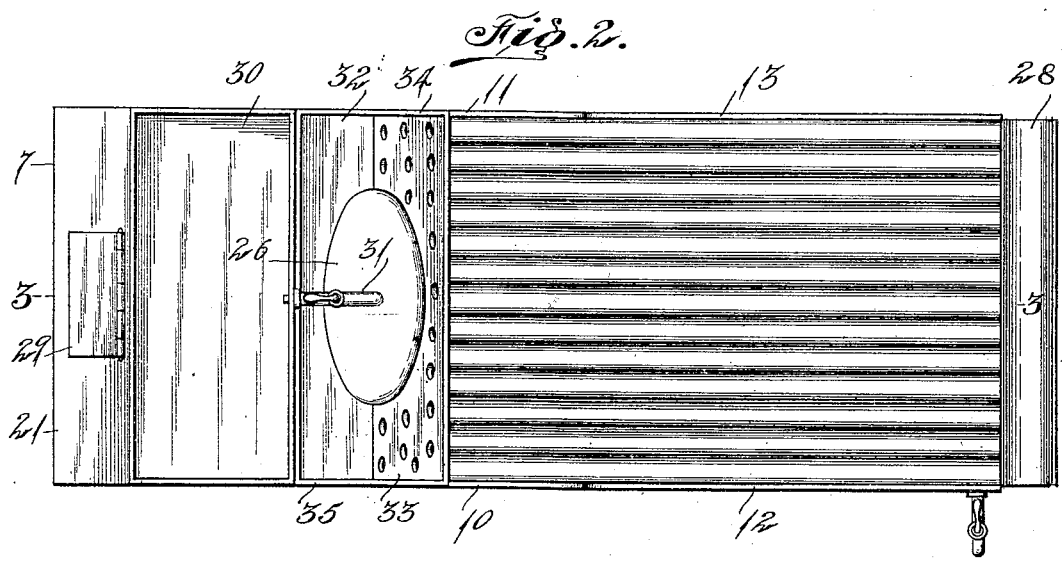
Witnesses
Jos Gregory
Inventor
Andrew L. Wastel.
By 
Attorneys A. L. WASTEL.
MILK COOLER.
APPLICATION FILED OCT. 5, 1909.
961,275.
Patented June 14, 1910.
2 SHEETS—SHEET 2.
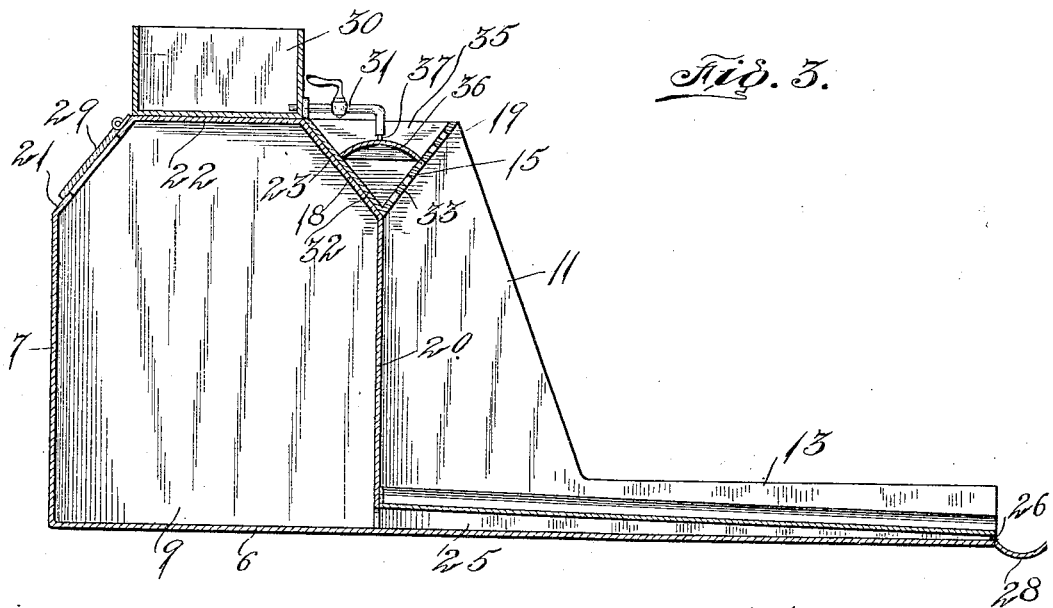
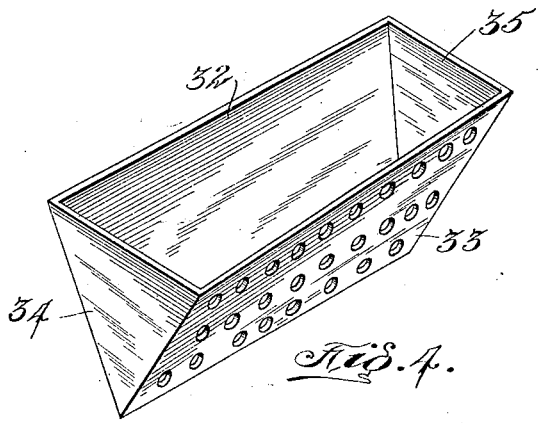
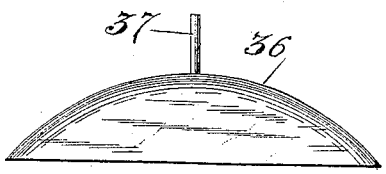
Witnesses
Jos L Gregory
E Quin Dunn
Inventor
Andrew L. Wastel
By Chandler & Chandler
Attorneys

UNITED STATES PATENT OFFICE.

ANDREW L. WASTEL, OF SHAWANO, WISCONSIN.

MILK-COOLER.

961,275.     Specification of Letters Patent.   Patented June 14, 1910.

Application filed October 5, 1909. Serial No. 521,120.

*To all whom it may concern:*

Be it known that I, ANDREW L. WASTEL, a citizen of the United States, residing at Shawano, in the county of Shawano, State of Wisconsin, have invented certain new and useful Improvements in Milk-Coolers; and I do hereby declare the following to be a full, clear, and exact description of the invention, such as will enable others skilled in the art to which it appertains to make and use the same.

This invention relates to that class of dairy utensils employed to remove animal heat from milk and has for its object, to provide an apparatus which will effectually cool milk and at the same time strain and clear same from impurities.

Another object of the invention is the provision of a receptacle for the cooling element having a conduit communicating therewith at its base, said receptacle forming a support for the milk supply and one wall of said conduit a trough for conveying the milk from the milk supply during a portion of its passage to a suitable depository.

A still further object of the invention is the provision of means for successively spreading the milk after it leaves the supply over constantly increasing areas and thus secure a more effectual cooling and aerating of same.

With the above and other objects in view the invention consists in the details of construction and in the arrangement and combination of parts to be hereinafter more fully set forth and particularly claimed.

In describing the invention in detail reference will be had to the accompanying drawings wherein like characters of reference denote corresponding parts in the several views, and in which, Figure 1 is a side elevation of the milk cooler constructed in accordance with the invention; Fig. 2, a top plan view of same; Fig. 3, a section on the line 3—3 of Fig. 2; Fig. 4, a detail view of the strainer, and Fig. 5, a detail view of the spreader which is associated with the delivery element of the milk supply and disposed within the strainer.

Referring to the drawings 6 indicates the bottom of the device, 7 the rear wall, and 8 and 9 the side walls which are of irregular formation having enlarged rear portions 10 and 11, and forwardly extending diminished portions 12 and 13 respectively; the top edge of said diminished portions being substantially parallel to the bottom 6. Formed in the top edges of the enlarged portions 10 and 11 of the side walls are corresponding recesses 14 and 15 respectively having the converging side edges 16, 17 and 18, 19 respectively, said recesses constituting a seat for a strainer of similar formation to be hereinafter referred to. Disposed between the side walls 8 and 9 is a vertical partition 20, the upper end of said vertical partition terminating at the point of convergence of the sides of the annular recesses 14 and 15 and short of the bottom 6 at its lower end for a purpose to be presently described. The rear wall 7 is inclined inwardly at its upper end as at 21 to correspond with the inclined edges 16 and 18 of the recesses 14 and 15. A horizontal top member 22 connects the sides 8 and 9 between the upper end of the inclined portion 21 of the rear wall and the upper end of the inclined edges 16 and 18 of the recesses 14 and 15, while another member 23 connects the top of the partition 20 with the front end of the horizontal top member 22, the portion 21 of the rear wall 11, the horizontal member 22 and the front member 23 constituting the top of the receptacle for the cooling element of the device; the front wall of which is formed by the partition 20.

The front end of the conduit 25 is closed as at 26 and a discharge element 27 communicating with said conduit 25 is mounted in the diminished portion 12 of the side wall 8. A trough 28 is secured to the bottom 6 transversely thereof at its extreme outer end and has one of its terminals provided with a delivery mouth. Formed in the inclined continuation 21 of the rear wall 7 is a hinged door 29 through which the receptacle for the cooling element may be supplied. Supported upon the top member 22 is a milk supply receptacle 30 whose bottom has substantially the same shape as said member 22. A discharge element 31 is mounted in the front wall of the receptacle 30 and communicates with the interior thereof. Seated in the recesses 14 and 15 so that the interior thereof will be disposed beneath the discharge element of the milk supply receptacle is a strainer. Said strainer being provided with the downwardly converging side walls 32 and 33 and triangular shaped end members 34 and 35. The side 33 of said strainer being perforated and adapted to lie forward of the side 32 when the strainer is positioned in the recesses 14 and 15. Supported within the strainer just described by the side members 32 and 33 is a spreader 36 having a spheroidal formation and provided with a pin 37 projecting upwardly from the center thereof and adapted to enter the discharge element 31 of the milk supply receptacle 30 so as to effectually spread the milk immediately same is drawn from the receptacle.

The operation of the device is as follows:— Assuming the receptacle 30 to be supplied with milk and the discharge element 31 open it will be apparent that the flow of milk will be intercepted at the mouth of the discharge element by the spreader 36 and flows over the entire spheroidal surface of said spreader during its passage into the strainer. The milk will then pass through the perforations in the side 33 of the strainer along the walls 20 to the corrugated sheet; then along said sheet into the trough 28 and then into a suitable depository by way of the delivery spout. It will be thus obvious that during the passing of the milk just described the same will be spread over successively increasing areas and the aeration and cooling thereof will be quickly and effectually had.

What is claimed is:

1. A milk cooler comprising a tank for the cooling element formed of a main receptacle having a forwardly extending diminished portion communicating therewith at its base, the top wall of said diminished portion being corrugated, a milk supply receptacle disposed upon the top of the main receptacle of the tank for a cooling element, a discharge element in communication with the interior of said milk supply receptacle, a strainer disposed beneath said discharge element and a spreader supported by said strainer adapted to divert the normal course of the flow of milk from said discharge element into said strainer.

2. A milk cooler comprising a tank for a cooling element formed of a main receptacle having a forwardly extending diminished portion communicating therewith at its base, a milk supply receptacle disposed upon the top of the main portion of the tank for a cooling element, a discharge element in communication with the interior of said milk supply receptacle, a strainer disposed beneath said discharge element, and a spreader supported by said strainer and adapted to divert the normal course of the flow of milk from said discharge element into said strainer; said strainer having a spheroidal formation and provided centrally with an upwardly projecting pin adapted to be disposed in the discharge element of the milk supply receptacle.

3. A milk cooler comprising a tank for a cooling element formed of a main receptacle having a forwardly diminished portion communicating therewith at its base, a milk supply receptacle disposed upon the top of the main portion of the tank for a cooling element, a discharge element in communication with the interior of said milk supply receptacle, a strainer disposed beneath said discharge element, said strainer being formed with downwardly converging sides, one of which is perforated, and a spreader supported by the converging sides of said strainer and adapted to divert the normal course of the flow of milk from said discharge element into said strainer.

In testimony whereof, I affix my signature, in presence of two witnesses.

ANDREW L. WASTEL.

Witnesses:
M. G. EBERLEIN,
GERTRUDE M. BUCK.